Jan. 28, 1936.   F. R. GETZ   2,029,230
DETACHABLE CAMERA TRIPOD HEAD
Filed Aug. 14, 1934
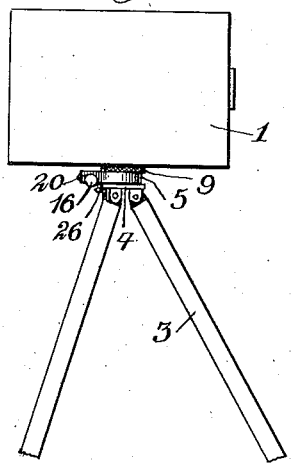
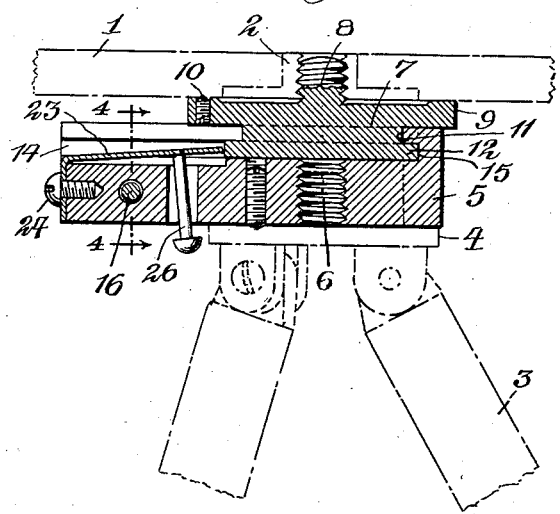
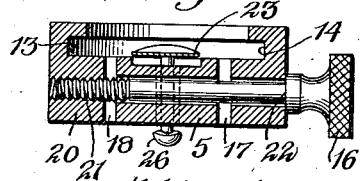
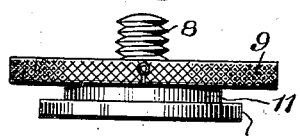
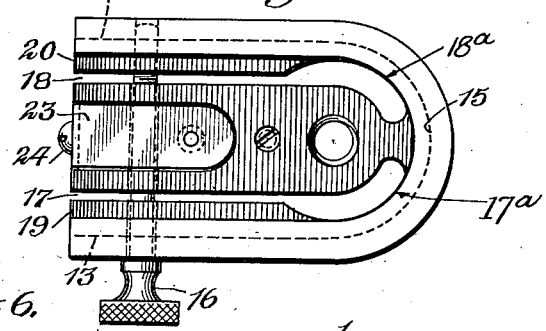
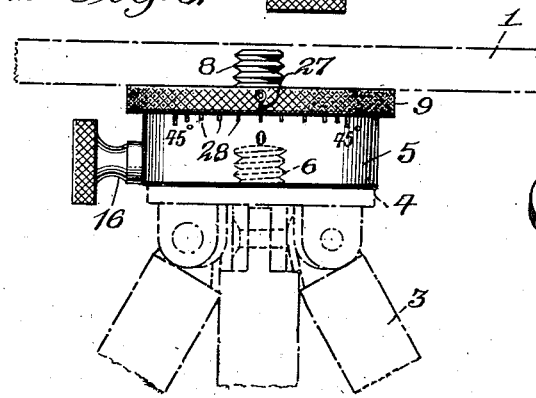
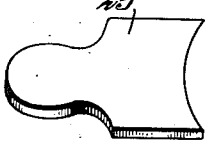
WITNESSES
INVENTOR
Forry Rohrer Getz
BY
Munn, Anderson & Liddy
ATTORNEYS Patented Jan. 28, 1936

2,029,230

UNITED STATES PATENT OFFICE 2,029,230

DETACHABLE CAMERA TRIPOD HEAD

Forry Rohrer Getz, New York, N. Y.

Application August 14, 1934, Serial No. 739,825

7 Claims. (Cl. 248—187)

This invention relates to a detachable camera tripod head, and has for an object to provide an improved construction which may be quickly mounted and dismounted.

Another object of the present invention is to provide a tripod head which may be quickly mounted and dismounted, and which may be locked in any angle of adjustment desired.

A further object of the invention is to provide a tripod head for cameras wherein a swinging structure is presented having graduations for indicating the angle at which a picture is taken so that successive pictures may be taken to produce a panorama, the parts being arranged to be readily locked in any adjusted position or unlocked.

In the accompanying drawing:—

Figure 1 is a side view of the camera with part of a tripod, and a detachable hammer head associated therewith;

Figure 2 is a longitudinal vertical sectional view through the head and associated parts shown in Figure 1, the same being on an enlarged scale;

Figure 3 is a plan view of the base of the head shown in Figure 1;

Figure 4 is a sectional view through Figure 2 on the line 4—4;

Figure 5 is a side view of the camera fitting coacting with the base shown in Figure 3;

Figure 6 is a view similar to Figure 2 but showing the parts in elevation and turned at 90°;

Figure 7 is a detailed perspective view of the key which may be used with the structure shown in Figure 2 in order to release the camera fitting from the base.

Referring to the accompanying drawing by numeral, 1 indicates a camera of any desired kind which is provided with the usual plate 2 having threads. 3 indicates a tripod of any desired construction having a top plate 4 on which the base 5 is mounted, said base being secured in place by being mounted on to the screw 6, which screw is preferably an integral part of plate 4.

The camera fitting 7 has a threaded stud 8 screwed into the threaded socket of plate 2. The fitting 7 is provided with a knurled surface 9 whereby the parts may be easily actuated and screwed into place or unscrewed whenever desired. After the fitting 7 has been screwed into place the set screw 10 is screwed so as to project slightly into the camera 1 whereby the fitting 7 cannot rotate. The fitting 7 is provided not only with the knurled portion 9 but with a projecting portion or extension which includes a reduced cylindrical section 11 and an enlarged cylindrical section 12 which is really an annular flange. This flange is adapted to be inserted into the respective facing grooves 13 and 14, then moved along these grooves to the end thereof which merges into the arc-shaped groove section 15. For instance, flange 12 is inserted from the left as shown in Figure 3, slipped along until it falls snugly into the arc-shaped groove 15, after which the thumb member 16 is actuated for drawing the parts together and thereby pinching the flange 12. It will be noted that the base 5 is provided with slots or slits 17 and 18 dividing the base into a central section and a pair of side sections 19, 20, and when the screw 16 is actuated in a given direction the side sections 19 and 20 will be drawn towards each other to produce a pinching action as far as the flange 12 is concerned. It is in said side sections that the facing grooves occur, said central and side sections, broadly speaking, cooperating to form a recess for receiving the foregoing extension. It is to be noted, further, that the side sections have relieved portions 17a, 18a for rendering the side sections resilient, thereby to insure the yielding of the latter under the pinching action described.

As shown in Figure 4 the screw 16 extends through base 5 to the part 20 where it is threaded into the base. When the screw is rotated in one direction the threaded portion 21 will produce a pulling action against the shoulder 22, and the parts 19 and 20 will gradually move towards each other until there is a good clamping action whereby the camera 1 cannot rotate. When the flange 12 has been first inserted into the grooves 13 and 14 and moved over to the position shown in Figure 2, spring 23 will function to lock the fitting against return movement but not against rotary movement. This spring is shown as a flat spring but some other form could be used without departing from the spirit of the invention, and instead of having a turned down portion clamped by screw 24, the spring could be held in place by other means. When the parts are in the position shown in Fig. 2 the fitting 7 cannot be moved until spring 23 has been lowered. Two methods may be used for securing this result, namely, the flat key 25 could be inserted into the grooves 13 and 14 and thereby force the spring downwardly or the pin 26 could be pulled downwardly from the position shown in Figure 2 until the spring 23 is out of the way of flange 12. Ordinarily when the parts are assembled they are first moved to the position shown in Figure 2 and then the camera 1 is rotated or moved back and forth until it is properly aimed. Screw 16 is actuated for locking the camera fitting 7 against movement. The mechanism of camera 1 is then actuated whenever desired according to the light or other conditions. After this has been done screw 16 is released and if it is desired to take another picture at a different angle the camera is rotated to the new angle and screw 16 tightened, and the second picture is then taken. This may be done as often as desired. In fact, the entire horizon may be taken if desired. When the camera reaches a point where rather suddenly the operator comes upon a scene which he is anxious to take, it is sometimes necessary to take the picture rather hurriedly. The present invention readily accommodates itself to this condition as the camera may be quickly placed on the tripod, aimed at the object or scene and locked. The mechanism of the camera may then be operated and the desired picture secured, the operation being performed in minimum time.

The camera may be readily dismounted from the tripod and moved, together with the tripod, to new scenes without any delay and the parts again set up and operated in minimum time.

As shown in Figure 6 the knurled member 9 is provided with a graduation 27, while the base 5 is provided with a number of graduations 28 showing various angles. If desired these graduations could be made entirely around the device though ordinarily 180° arrangement of graduations is ample and many times only 90° is desirable. Instead of having all the graduations 28 on the base 5 they could be placed on member 9 and the graduations 27 on base 5 so that a complete rotary movement of camera 1 might be made and pictures taken at any point.

I claim:—

1. In a device of the character described, a fitting adapted to be removably connected with the camera, said fitting having an annular flange, a base adapted to be removably connected with a tripod, said base having a pair of parallel grooves merging at a given point, said grooves at and adjacent the point of merging being arc-shaped, said grooves being spaced apart and formed to receive said flange, spring means for locking said flange within said groove in such a manner as to permit the flange to rotate, and means acting on the base for causing the base to pinch said flange and thereby lock said fitting to said base.

2. A device of the character described, including a fitting adapted to be connected with a camera, said fitting having a flange, a base adapted to be carried by a tripod, said base having a groove for receiving said flange, a flat spring carried by said base and projecting normally into the path of movement of the flange as it enters said base, said spring being depressed as the flange enters the base, and after the flange has completely entered the base said spring being adapted to be expanded and presenting an abutment against removal, and screw means acting on the base to cause the base to pinch said flange and prevent independent rotation thereof.

3. A device of the character described, including a fitting adapted to be removably secured to the bottom of a camera, said fitting having an integral projecting portion presenting an annular flange, and a base adapted to be removably secured to a tripod, said base having a groove formation having a pair of parallel facing portions for receiving said flange, the facing portions of said groove formation being spaced apart sufficiently to permit free rotation of said flange, means for normally preventing the removal of said flange from said base, manually actuated means for shifting the means out of the way so that said flange may be moved out of said base, and manually actuated screw means acting on the base for causing the same to clamp said flange and lock the same against rotation.

4. A detachable camera tripod head comprising a base adapted to be connected to a tripod, said base being formed with a pair of parallel slits near the respective sides thereof, said slits extending inward from one end to near the opposite end and dividing said base into a central section and a pair of side sections, a fitting adapted to be connected to a camera, said fitting and side sections being slidably engageable, and means carried by said base for moving said side sections toward each other for causing the side sections to pinch said fitting and thereby lock said fitting against removal from said base.

5. A device of the character described including a fitting having a flange, a base having a pair of parallel slits extending from one end to near the other end for dividing the base into a central section and a pair of side sections, said side sections being provided with a pair of facing grooves for receiving said flange, and a screw member extending through the base substantially at right angles to said slits near the end of the base through which said slits extend, said screw member acting to draw said sections towards each other so that said side sections will pinch said flange for locking said fitting against rotation.

6. In a device of the character described, a fitting adapted to be connected with a camera, said fitting having an annular flange, a base having a pair of parallel slits extending from one end to near the other end for dividing the base into a central section and a pair of side sections, said side sections being provided with a pair of facing grooves for receiving said flange, said groove formation being such that the flange may be quickly slid horizontally into and out of position when the base is in a substantially horizontal position, and means acting on said side sections for causing the side sections to move towards said central section and press against and substantially lock said flange against movement.

7. Means for detachably connecting a camera to a tripod, consisting of a fitting adapted to be connected to a camera, said fitting having an extension, a base adapted to be carried by the tripod, said base having a pair of parallel slits extending from one end to near the other end dividing the base into a central section and a pair of side sections cooperating to form a recess for receiving said extension, each of said side sections at said other end having a relieved portion for rendering the side sections resilient, and a screw member extending through said base sections, said screw member when actuated causing said side sections to move toward the central section thereby to grip said extension and lock said base to said fitting.

FORRY ROHRER GETZ.